United States Patent [19]

Maruyama et al.

[11] Patent Number: 4,580,832
[45] Date of Patent: Apr. 8, 1986

[54] AUXILIARY SEAT ASSEMBLY FOR USE IN VEHICLES

[75] Inventors: Hidekazu Maruyama, Kokubunji; Fujio Takahashi, Yokohama, both of Japan

[73] Assignee: Ikeda Bussan Co., Ltd., Kanagawa, Japan

[21] Appl. No.: 604,114

[22] Filed: Apr. 26, 1984

[30] Foreign Application Priority Data

May 23, 1983 [JP] Japan .................................. 58-90387

[51] Int. Cl.[4] .......................... B60N 1/10; A47C 9/06
[52] U.S. Cl. ...................................... 297/14; 297/324; 297/335
[58] Field of Search ................. 297/14, 324, 331, 335, 297/336

[56] References Cited

U.S. PATENT DOCUMENTS

| 709,286 | 9/1902 | Wilkinson | 297/324 |
| 1,412,367 | 4/1922 | Noack | 297/324 |
| 3,594,037 | 7/1971 | Sherman | 297/316 X |
| 4,270,794 | 6/1981 | Lewis | 297/14 |
| 4,460,215 | 7/1984 | Chamberlain et al. | 297/14 |

FOREIGN PATENT DOCUMENTS 989342 9/1951 France ................................ 297/324

Primary Examiner—William E. Lyddane
Assistant Examiner—Peter R. Brown
Attorney, Agent, or Firm—Jordan and Hamburg

[57] ABSTRACT

An auxiliary seat assembly is proposed for use in the cab of automobiles or the similar vehicles; for effective utilization of the cab inside space, the seat cushion and seat back can be housed as folded in a pocket formed in the rear or lateral body panel of the cab.

5 Claims, 6 Drawing Figures

AUXILIARY SEAT ASSEMBLY FOR USE IN VEHICLES

BACKGROUND OF THE INVENTION

1. Field of the Invention

The present invention relates to an improved auxiliary seat assembly for use in vehicles, and more particularly to an auxiliary seat assembly which is foldably installed at the lateral or rear portion of the cab of a vehicle such as truck or the like.

2. Description of the Prior Art

Heretofore, various many auxiliary seat assemblies of this kind have been proposed, one of which will be described as an example with reference to FIG. 1. The auxiliary seat assembly (will be referred to as "the seat" hereinafter) is installed at the lateral or rear portion of the cab of a vehicle such as truck, and it is used as follows.

For example, in case two drivers ride in the cab of a truck on duty for a long-distance transport and they drive it in shifts day and night, one of them can take a nap or rest on the seat while the other is driving. While not used, the seat can be folded along the body panel 8 for effective use of the space in the truck cab. The seat comprises a seat cushion 3 and seat back 5. The seat cushion 3 is pivotably mounted on a pair of brackets 7 installed on the floor 6 at the rear or lateral portion of the cab, the seat back 5 being fixed to the body panel 8. As mentioned above, when the seat is not used, the seat cushion 3 can be pivoted toward the seat back 5 until it is superposed on the seat back 5, namely, to an upright position in which the seat cushion 3 can be held as folded by means of a hook, for example. Thus, the space in the cab can be effectively used. When using the seat, the seat cushion 3 is pivoted reversely and supported almost horizontally by means of a stay 9 so that one can seat or lay himself on it.

As mentioned above, the seat cushion 3 is pivotally supported on the brackets 7 installed on the floor at the lateral or rear portion of the cab. The brackets 7 supporting the seat cushion 3 have a relatively large volume and so a part of the cab space is occupied by the massive brackets. Therefore, even if the seat cushion 3 is folded to the seat back 5, the brackets 7 on the floor 6 make it difficult to effectively use the space in the cab. When the seat cushion 3 is folded, not only the whole seat but the brackets 7 as well as the pivoting mechanisms are visible, causing the cab interior to esthetically be degraded. Further, since the brackets 7 remain fixed after the seat cushion 3 is folded to the seat back 5, no baggages or the like can be put on the cab floor.

SUMMARY OF THE INVENTION

The present invention has an object to overcome the above-mentioned drawbacks of the conventional such seats, by providing a neatly foldable seat for use in vehicles, whereby it is possible to effectively use the cab internal space.

The present invention has another object to provide a seat for use in vehicles, which is so designed as to be received in a pocket in the cab wall.

These and other objects and advantages of the present invention will be better understood from the enusing description made by way of example of the embodiment of the inventive seat with reference to the drawings.

DETAILED DESCRIPTION OF THE PREFERRED EMBODIMENT

Figure 1:
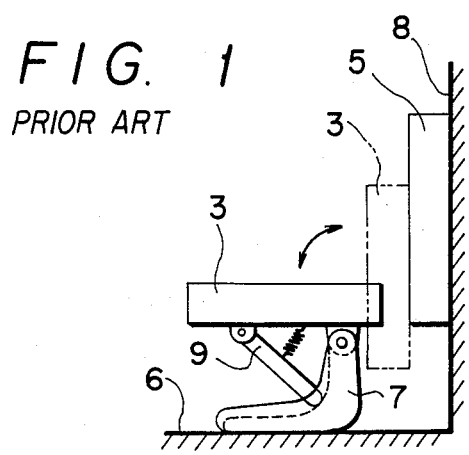
FIG. 1 is a sectional view of a conventional seat assembly.
Figure 2:
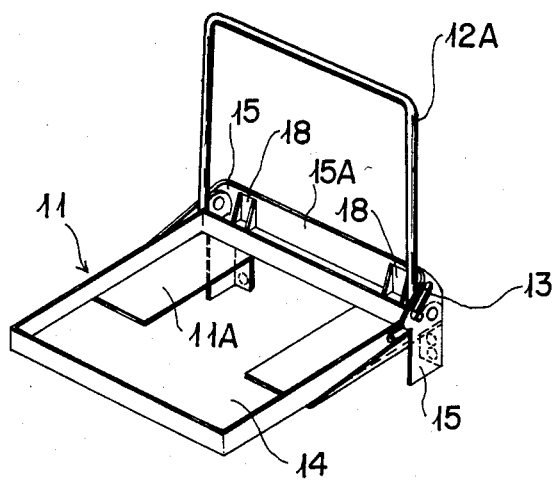
FIG. 2 is a, perspective view of an embodiment of the inventive seat for use in vehicles.
Figure 3:
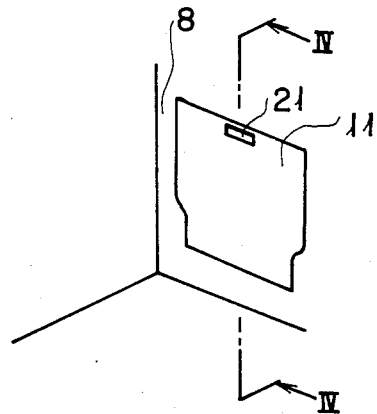
FIG. 3 is also a perspective view of the inventive seat in the unused position.
Figure 4:
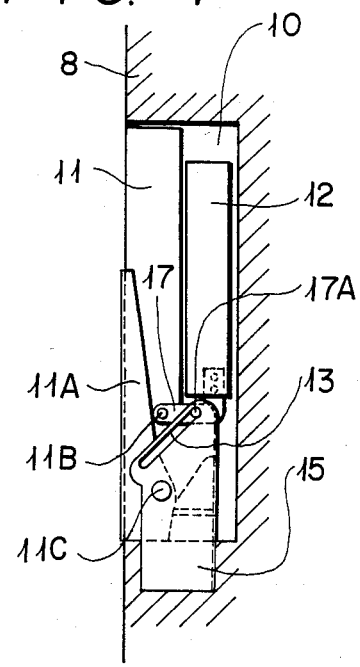
FIG. 4 is a sectional view taken along the line IV—IV in FIG. 3.

Referring to FIGS. 2 to 6 showing the embodiment of inventive seat used as auxiliary seat in a vehicle such as truck or the like, the seat is so designed as to be housed as folded in a pocket 10 formed in a body panel 8 of the truck cab's for effective utilization of the cab internal space.

Generally in automobiles of such kind, the cab is isolated from the baggage room by the body panel 8 and so it has only a limited space. The seat is foldably installed at the lateral or rear portion of the cab for taking a nap or rest on it. When the seat is not used, a seat cushion 11 can be erected as pivoted and housed as foled along with a seat back 12 in the pocket 10. When the seat is used, the seat cushion 11 can be swung as pivoted from the pocket 10. Then the seat back 12 is taken out of the pocket 10, thus forming an ordinary seat on which one can seat himself.

That is, the inventive seat for use in vehicles comprises a pocket 10 formed in the body panel 8 and in which the seat back 12 and folded seat cushion 11 are housed, a pair of brackets 15 disposed at both end of the pocket 10 and which pivotably support a cushion frame 11A, each bracket having formed therein an elongated guide hole 13 which is gradually slanted depthwise and upwards, and a pair of connecting arms 17 each pivotably connected at one end thereof to the cushion arm 11A having a pin 17A guided as engaged in the guide hole 13 in the bracket 15, for thereby connecting a back frame 12A of the seat back 12 and the cushion frame 11A to each other.

More specifically, according to this embodiment, the pocket 10 is formed in the body panel 8 located at the lateral portion of the cab, namely, at the rear of the side door of the cab. This pocket 10 is intended to house, when the seat is not used, the seat cushion 11 as folded and seat back 12. The brackets 15 provided at the opposite ends of the pocket 10 are integrally formed together by means of a connecting bracket 15A for improved rigidity and assembling precision of the seat, so that they form together a gate-like shape. As mentioned above, there is formed in each of these brackets 15 the elongated guide hole 13 gradually inclined depthwise of the pocket 10 and upwards. The bracket 15 has connected thereto a connecting arm 17 by means of a pin 17A thereof freely fitted in the guide hole 13 of the bracket. The connecting arm 17 is movable depthwise along the guide hole 13. Also the connecting arm 17 has a nearly L-like shape, and it is connected at one end thereof to the back frame 12A while the other end is pivotably connected to the cushion frame 11A by means of a pin 11B. The cushion frame 11A is pivotally mounted on the bracket 15 by means of a pin 11C which is located near the base end of the cushion frame 11A but away from the pin 11B. As seen from the foregoing, the connecting arm 17 is pivotally connected at one end thereof to the seat cushion 11 and has the pin 17A guided in and along the guide hole 13. Thus, the connecting arm 17 keeps a same posture even when the seat cushion 11 is pivoted about the pin 11C. Thus, when the seat is not used, as the seat cushion 11 is pivoted to an upright position, the connecting arm 17 is moved as guided along the guide hole 13 along with the pivotal movement of the seat cushion 11 and also the seat back 12 is correspondingly moved depthwise of the pocket 10, so that it is housed together with the seat cushion 11 in the pocket 10. The connecting bracekt 15 has provided thereon at positions off the ends thereof a pair of stoppers 18 which will abut the cushion frame 11A to limit the cushion frame 11A from pivoting downward, for thereby keeping it in horizontal position. The back of the seat cushion 11 is made of a same material as that of the body panel 8 so that when the seat is not used, the seat back will form a part of the body panel 8 for the esthetic purpose. The reference numeral 21 indicates a handling hole.

Figure 5:
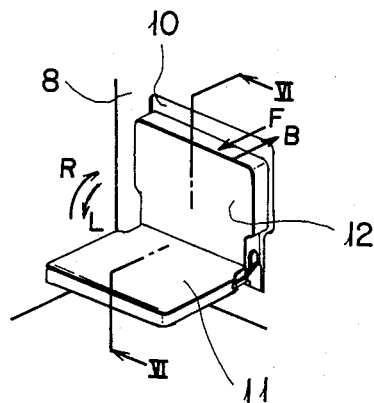
FIG. 5 is a perspective view of the inventive seat in the used position.
Figure 6:
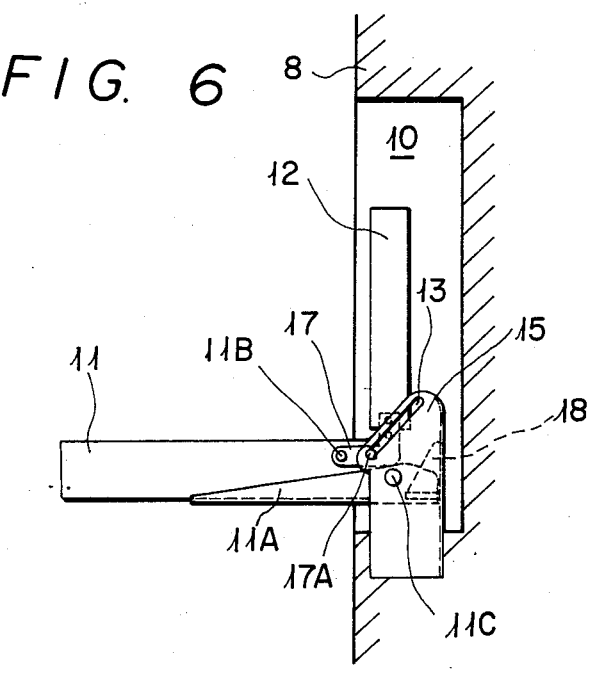
FIG. 6 is a sectional view taken along the line VI—VI of FIG. 5.

The seat according to the present invention is used as follows:

In order to house the seat cushion 11 and seat back 12 into the pocket 10 from the used position shown in FIGS. 5 and 6, the seat cushion 11 has only to be pivoted in the direction of arrow R with the handling hole 21 held by hand. The seat cushion 11 is pivoted about the pin 11C, and along with this pivotal movement, the connecting arm 17 will be moved as guided along the guide hole 13 while keeping the fixed posture. Also as these movements go, the seat back 12 is moved parallelly depthwise of the pocket 10 while keeping the upright posture. When the seat cushion 11 is folded to the upright position, it has the rear surface made flush with the surface of the body panel 8 and the seat back 12 is housed on the top surface side of the seat cushion 11 inside the pocket 10, which is the housed position shown in FIGS. 3 and 4. Thus, the seat is cleared from the cab internal space so that the space can be effectively used for any purpose.

Oppositely, for use of the seat from this housed position, first the seat cushion 11 is pulled out by holding the handling hole 21. The seat cushion 11 is pivoted in the direction of arrow L. As this pivotal movement goes, the seat back 12 is parallelly moved toward the seat cushion 11 in an opposite process to that of housing the seat cushion and seat back into the pocket 10. When the seat cushion 11 comes to the horizontal position, the seat back 12 comes to a position where it somewhat projects from the body panel 8; thus, the seat is usable, which position is shown in FIGS. 5 and 6. Here, one can take a nap or rest on this seat.

As apparent to those skilled in the art, the present invention is not limited to the embodiment having been described in the foregoing, it can be embodied in various many forms of variations and modifications. In the above embodiment, the connecting arm was provided to connect the cushion and back frames to each other. According to a variation of the present invention, however, the lower end of the back frame may be extended, and this extension may be bent to a nearly L-shape of which the free end is pivotably mounted on the cushion frame. A pin is provided projectingly on the extension is freely fitted in the guide hole in the bracket, thus providing a foldable seat.

As will be appearent from the foregoing description, the seat according to the present invention comprises a pocket formed in the body panel of a cab and in which a seat back and seat cushion are to be housed, a pair of brackets disposed at the opposite ends of the pocket and each having formed therein an elongated guide hole which is gradually slanted depthwise of the pocket and upwards, a pair of connecting arms pivotably connected to the seat cushion and each having a pin which is guided as engaged in the guide hole in the bracket, and a seat back mounted on the other ends of the connecting arms. When the seat is not used, just erecting, by pivoting, the seat cushion will enable the seat cushion as folded and seat back to be housed in the pocket in the body panel. For using the seat, cushion is pulled out, the seal from the pocket by pivoting the same. The seat back is also moved forwardly thus forming the shape of a seat on which one can seat himself. Thus, the present invention provides a seat which is not only easy to use but effective to utilize in the cab internal space while providing an esthetic improvement.

What is claimed is:

1. In combination, an auxiliary seat assembly adapted to be situated at a side portion of a vehicle and means for receiving the auxiliary seat assembly, comprising:

a pocket formed in the side portion of a vehicle and having front and lower portions, the seat assembly being received in the pocket when folded, a pair of brackets disposed away from each other and securely fixed to the lower portion of the pocket, each bracket having an elongated guide hole extending rearwardly and upwardly from the front lower portion of the pocket to form a slant guide therein;

a seat having upper, rear and two side portions and seat pins, said seat being situated between the brackets at the rear portion thereof and pivotally connected to the brackets by means of the seat pins respectively below the elongated guide holes respectively so that the seat can be rotated relative to the brackets between horizontal and upright positions, a pair of L-shaped connecting arms each pivotally connected at one end thereof to the side portions of the seat and having a pin extending perpendicularly outwardly from each L-shaped connecting arm, said pin being slidably situated in said elongated guide hole, and a seat back securely fixed to the ends other of the connecting arms so that when the seat is horizontally positioned, the seat back is located in a forward position inside the pocket, and when the seat is rotated to the upright position, the seat back is moved rearwardly to thereby allow the seat to be completely located in the pocket.

2. A combination according to claim 1, further comprising at least one stopper connected to the bracket, said stopper abutting against the rear portion of the seat when the seat is in the horizontal position to thereby prevent the seat from rotating downwardly.

3. A combination according to claim 2, in which said brackets include means for connecting the two brackets, said stopper being securely fixed to the means for connecting the brackets.

4. A combination according to claim 3, in which said seat includes a frame pivotally connected to the brackets, said frame abutting against the stopper when the seat is in the horizontal position, and a cushion fixed to the frame.

5. A combination according to claim 4, in which said seat back is provided with a back frame extending inside the seat back, said back frame being securely fixed to the connecting arms.

* * * * *